United States Patent
Ian Laming et al.

(10) Patent No.: US 7,031,568 B2
(45) Date of Patent: Apr. 18, 2006

(54) OPTICAL POWER MONITOR

(76) Inventors: Richard Ian Laming, 6 Braid Mount View, Edinburg EH10 6 JL (GB); Harm Van Weerden, Springendalhoeck 22, 7456GT, NL-Enschede (NL)

(*) Notice: Subject to any disclaimer, the term of this patent is extended or adjusted under 35 U.S.C. 154(b) by 90 days.

(21) Appl. No.: 10/433,056

(22) PCT Filed: Nov. 30, 2001

(86) PCT No.: PCT/GB01/05309

§ 371 (c)(1), (2), (4) Date: Sep. 24, 2003

(87) PCT Pub. No.: WO02/45299

PCT Pub. Date: Jun. 6, 2002

(65) Prior Publication Data

US 2004/0047560 A1 Mar. 11, 2004

(30) Foreign Application Priority Data

Dec. 1, 2000 (GB) .................................. 0029408

(51) Int. Cl.
*G02B 6/34* (2006.01)
(52) U.S. Cl. .......................................... 385/37; 385/48
(58) Field of Classification Search ................ 385/48, 385/31, 37, 46
See application file for complete search history.

(56) References Cited

U.S. PATENT DOCUMENTS 5,706,377 A * 1/1998 Li ................................ 385/37
5,768,450 A * 6/1998 Bhagavatula ................. 385/24

(Continued)

FOREIGN PATENT DOCUMENTS

GB 2 346 024 A 7/2000

OTHER PUBLICATIONS

K. Okamoto et al., "Arrayed-waveguide grating multiplexer with flat spectral response", Jan. 1, 1995, vol. 20, No. 1, Optics Letters, XP 000481041, pp. 43-45.

*Primary Examiner*—Sung Pak

(57) ABSTRACT

An optical power monitor comprises: an array waveguide grating comprising first and second optical interaction regions between which an input optical signal propagates from a first position on a first side of the first optical interaction region to a second position on a second side of the second optical interaction region, a correspondence between said first and second positions depending upon a wavelength of the optical signal, there being a plurality of array waveguides coupled between a second side of the first optical interaction region and a first side of the second optical interaction region, and a plurality of output waveguides coupled at one end to the second side of the second optical interaction region for outputting different wavelength channel outputs from the second optical interaction region; and detector for detecting said different wavelength channel outputs at the other ends of the output waveguides: wherein the plurality of output waveguides includes at least two output waveguides for at least one of the wavelength channels.

15 Claims, 3 Drawing Sheets

U.S. PATENT DOCUMENTS

| | | |
|---|---|---|
| 6,023,544 A | 2/2000 | Dragone |
| 6,069,990 A | 5/2000 | Okawa et al. |
| 6,188,818 B1 * | 2/2001 | Han et al. ............... 385/24 |
| 6,389,201 B1 * | 5/2002 | Urino .................... 385/43 |
| 6,549,313 B1 * | 4/2003 | Doerr et al. ............. 385/16 |
| 6,690,859 B1 * | 2/2004 | Menezo .................. 385/37 |
| 6,810,177 B1 * | 10/2004 | Kaneko .................. 385/37 |
| 6,842,560 B1 * | 1/2005 | Yamauchi et al. ........ 385/24 |
| 6,937,795 B1 * | 8/2005 | Squires et al. ........... 385/37 |
| 2002/0191887 A1 * | 12/2002 | Bidnyk ................... 385/15 |

* cited by examiner

OPTICAL POWER MONITOR

The present invention relates to dispersive optical devices. More specifically, but not exclusively, the invention relates to an optical power monitor incorporating a dispersive optical device.

In order to meet the ever-increasing demand for transmission bandwidth in communication networks, operators are investing heavily in the development of techniques for Dense Wavelength Division Multiple (DWDM). DWDM employs many closely spaced carrier wavelengths, multiplexed together onto a single waveguide such as an optical fibre. The carrier wavelengths are spaced apart by as little as 50 GHz in a spacing arrangement designed in the style of an ITU (International Telecommunications Union) channel "grid". Each carrier wavelength may be modulated to provide a respective data transmission channel. By using many channels, the data rate of each channel can be kept down to a manageable level.

Clearly, to utilize this available bandwidth it is necessary to be able to separate, or demultiplex, each channel at a receiver. New optical components for doing this have been designed for this purpose, one of these being the Array Waveguide Grating (AWG). An array waveguide grating is a planar structure comprising a number of arrayed waveguides which together act like a diffraction grating in a spectrometer. AWGs can be used as multiplexers and as demultiplexers, and a single AWG design can commonly be used both as a multiplexer and demultiplexer. A typical AWG mux/demux 1 is illustrated in FIG. 1 and comprises a substrate or "die" 1 having provided thereon an input waveguide 2 for a multiplexed input signal, two "slab" or "star" couplers 3,4 connected to either end of an arrayed waveguide grating 5 consisting of an array of transmission waveguides 8, only some of which are shown, and a plurality of single mode output waveguides 10 for outputting respective wavelength channel outputs from the second (output) slab coupler 4 to the edge 12 of the die 1.

One use for an AWG in a DWDM network is to monitor power in a multiplexed signal. The multiplexed signal is input to the AWG and by locating appropriate detectors at the output edge 12 of the AWG device, the power output from each wavelength channel can be detected.

One problem with such power monitors is that the output power response from each single mode output channel is Gaussian shaped, as illustrated in FIG. 2(a). In an ideal power monitor, the output response from each wavelength channel would have a square or "flat" response, as illustrated in FIG. 2(b). This would mean that each channel output could be more easily and reliably detected by a detector means arranged to receive the channel output. A flatter shaped response could be achieved by flat the peak in the output power response (for the same passband, P) and/or broadening the passband, P, of the channel (which will effectively flatten the output response).

A further problem with the prior art devices utilizing single-mode output waveguides is that over time the actual position of the focused wavelengths, on the output face of the second coupler, may change due to changing conditions in the device itself over time, and/or environmental changes affecting the device. When such changes in the output positions occur, degradation of the power output from output waveguides may occur.

Prior art AWG designs are known in which a multi-mode interference (MMI) filter is located adjacent the second slab coupler, between the second slab coupler and the ends of the output waveguides, in order to obtain a flatter output response. However, this flattened response is obtained at the expense of power loss in the device.

It is an object of the present invention to avoid or minimize one or more of the foregoing disadvantages.

According to a first aspect of the invention there is provided an optical power monitor comprising:

an array waveguide grating comprising first and second optical interaction regions between which an input optical signal propagates from a first position on a first side of the first optical interaction region to a second position on a second side of the second optical interaction region, a correspondence between said first and second positions depending upon a wavelength of the optical signal, there being a plurality of array waveguides coupled between a second side of the first optical interaction region and a first side of the second optical interaction region, and a plurality of output waveguides coupled at one end to the second side of the second optical interaction region for outputting different wavelength channel outputs from the second optical interaction region; and detector means for detecting said different wavelength channel outputs at the other ends of the output waveguides; wherein the plurality of output waveguides include at least two output waveguides for at least one of the wavelength channels.

The power monitor according to the invention has the advantage of a flatter power output response for each wavelength channel output, as compared with the conventional case where one single mode output waveguide is used for each wavelength channel output.

Preferably, at least one detector is provided for each channel output.

Preferably, two single mode output waveguides are provided for each channel output. Optionally, more than two single mode output waveguides may be provided for each channel. The output ends of the two single mode output waveguides for each channel are preferably spaced sufficiently close together to enable a single detector to be used to detect the output from each output waveguide for the said channel. Alternatively, there may be a plurality of detectors provided for each channel, there being one detector for each single mode output waveguide.

Alternatively, said at least two output waveguides for said at least one channel are multiple mode waveguides, most preferably double mode waveguides. Preferably, two output waveguides are provided fox each channel output, and each said output waveguide is a double mode waveguide.

According to a second aspect of the invention there is provided a dispersive optical device for use in a power monitor, the device comprising:

an array waveguide grating comprising first and second optical interaction regions between which an input optical signal propagates from a first position on a first side of the first optical interaction region to a second position on a second side of the second optical interaction region, a correspondence between said first and second positions depending upon a wavelength of the optical signal, there being a plurality of array waveguides coupled between a second side of the first optical interaction region and a first side of the second optical interaction region, and a plurality of output waveguides coupled to the second side of the second optical interaction region for outputting different wavelength channel outputs from the second optical interaction region to an output edge of the optical device; wherein the plurality of output waveguides include at least two output waveguides, preferably two single mode output waveguides, for at least one of the channel outputs, most preferably for each channel output.

Preferred embodiments of the invention will now be described by way of example only and with reference to the accompanying drawings in which.

Figure 3:
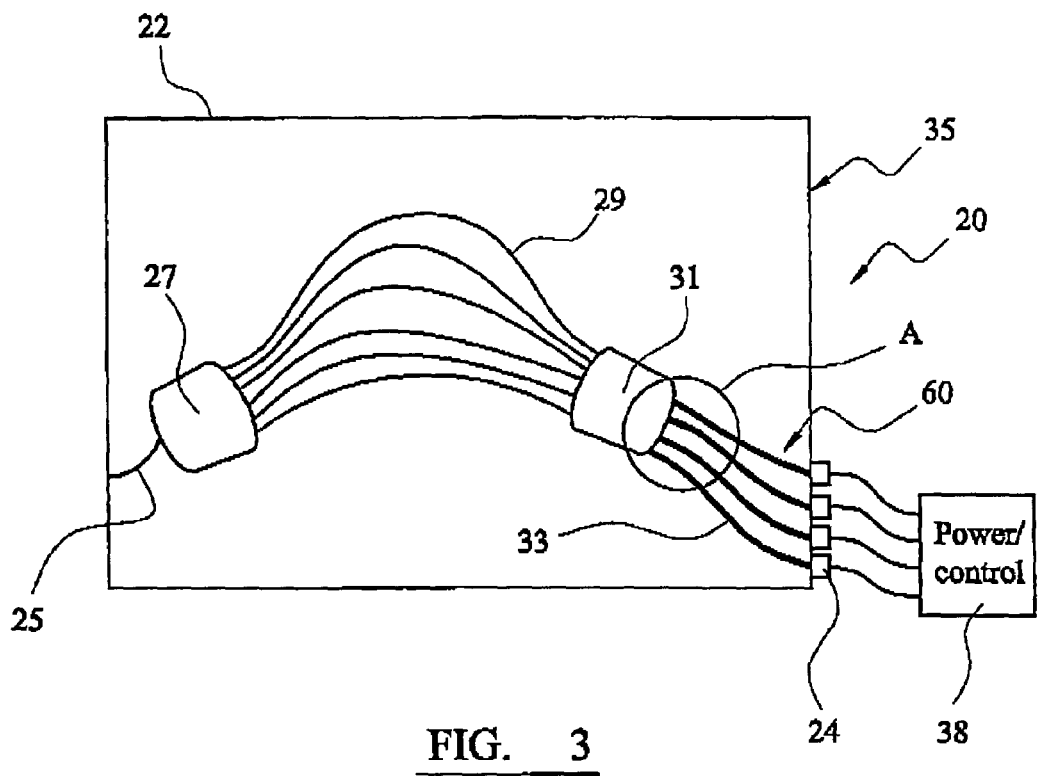
FIG. 3 is a schematic plan view of a power monitor according to the invention.
Figure 4:
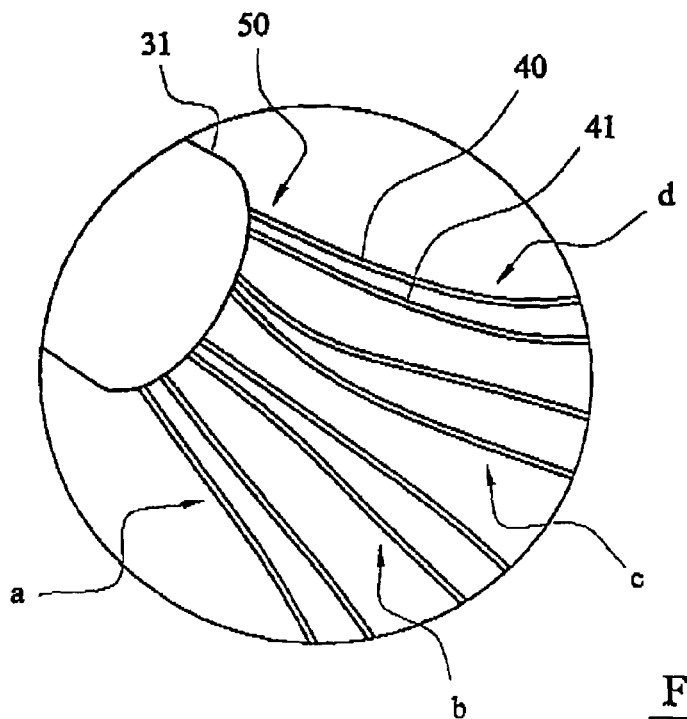
FIG. 4 is a magnified view of the ringed portion A of device of FIG. 3.

FIGS. 3 and 4 shows a power monitor 20 according to a first embodiment of the invention. The power monitor 20 consists of an AWG device and a plurality of detectors 24, there being one detector provided for each wavelength channel output of the AWG. The AWG device is formed on a substrate or "die" 22 and comprises an input waveguide 25, a first optical interaction region in the form of a slab coupler 27, an array of waveguides 29 (only six shown) of different optical path lengths and arranged between the first slab coupler and a second slab coupler 31 (providing a second optical interaction region), and a plurality of output waveguides 33 (eight shown). In generally known manner there is a constant predetermined optical path length difference between adjacent waveguides 29 in the array, which determines the position of the wavelength output channels on the output face of the second slab coupler 31. The construction and operation of such AWGs is well known in the art. A plurality of detectors 24 are arranged adjacent an output edge 35 of the die. The detectors 24 are connected to power/control electronic circuitry 38.

The arrangement of the output waveguides 33 is shown in detail in the magnified view of FIG. 4. The output waveguides 33 are each single mode waveguides, and there are two such single mode output waveguides 40,41 provided for each wavelength output channel of the AWG. As shown in FIG. 3, there is one detector 24 for each pair a,b,c,d of output waveguides 33.

The width of each output waveguide is typically approximately 6 μm. The ends 50 of the output waveguides in each pair a,b,c,d of output waveguides, in the region of the second slab coupler 31, are typically spaced apart by a width in the range of 8–10 μm. The spacing between adjacent ones of the pairs a,b,c,d of output waveguides is typically approximately 25 μm. Between the waveguide ends 50 coupled to the second coupler 31, and the other ends 60 of the waveguides (located at the edge 35 of the die 22), the spacing between the waveguides in each pair a,b,c,d increases. Thus, in each pair of output waveguides, the waveguides effectively "fan-out" from each end 50,60 towards the middle portion of the waveguides, the arrangement being such that the waveguides in each pair are substantially coupled at their ends and substantially uncoupled therebetween.

Figure 1:
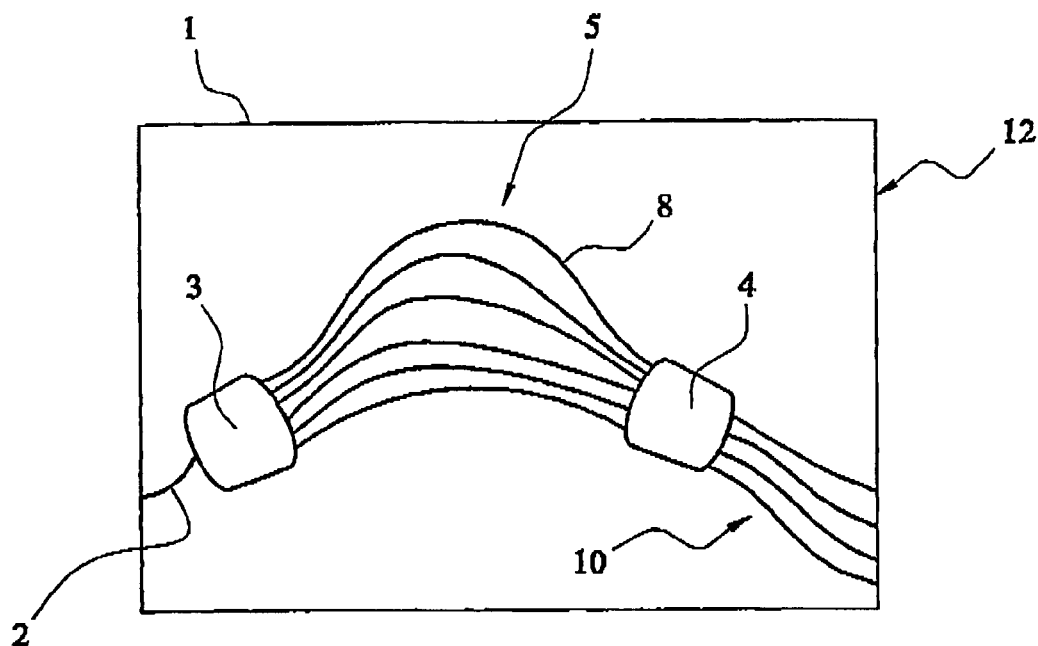
FIG. 1 is a schematic plan view of a known dispersive optical device.
Figure 2A:
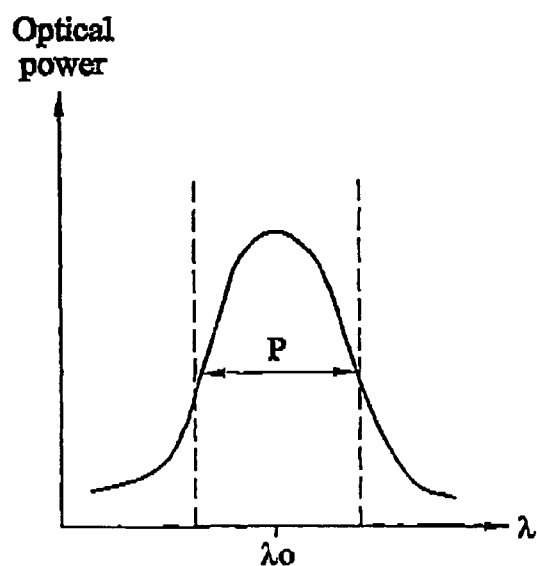
FIG. 2(a) illustrates a typical Gaussian passband response for a single-mode output waveguide.
Figure 2B:
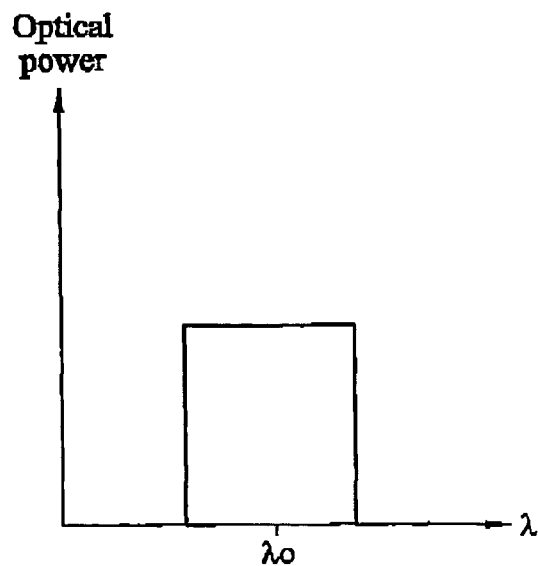
FIG. 2(b) illustrates al ideal passband response for an output waveguide.
Figure 5:
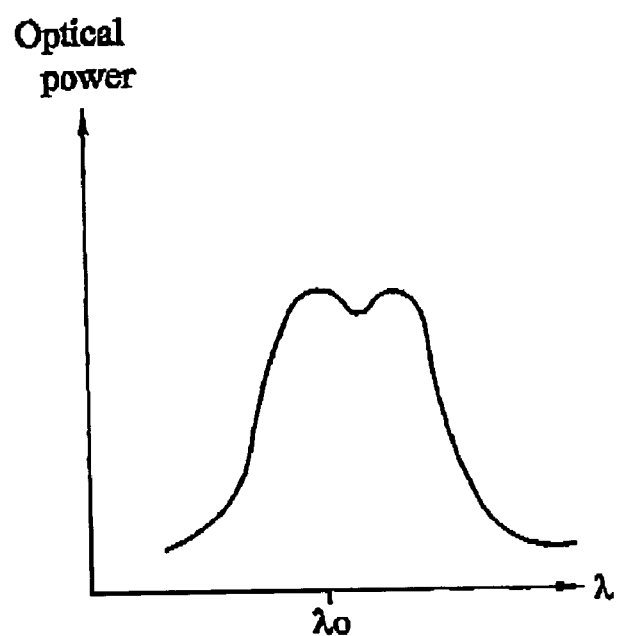
FIG. 5 illustrates the passband response for the device of FIG. 4.

The ends 50 of the two single mode output waveguides which are coupled to the second slab coupler, for each channel output, effectively pick up a broader range of wavelengths for a given channel output than if only one single mode waveguide were used. Each single mode waveguide output has the conventional Gaussian passband response like that of FIG. 2(a). The outputs from the twin single mode waveguides are effectively combined in the respective channel detector 24, at the output edge 35 of the die 22, giving a combined output power response generally of the form shown in FIG. 5 i.e. having two generally smaller peaks 60,61, giving a much flatter overall response than the corresponding Gaussian distribution for one single mode output waveguide for the channel.

In addition to the main benefit of a flatter power output response, the inventive devices also have the benefit that should changes occur in the AWG device itself (e.g. physical changes over time, and/or changes caused by environmental conditions) which cause movement in the focused positions of the wavelength channels on the output side of the second slab coupler, where in the conventional design of one single mode waveguide per channel this could cause degradation in the power output from each channel, in the devices of the present invention the two single mode waveguides for each channel, will avoid, or at least minimize, the effect of such changes in the AWG on the channel outputs (to at least some extent).

It will be appreciated that the chosen spacing of the ends 50 of the two single mode waveguides in each pair a,b,c,d of output waveguides, where they are coupled to the second slab coupler 27, will affect the nature of the flattening which occurs in the combined output power response at the detector. For example, the wider apart that the two waveguide ends 50 in each pail are spaced from one another, the broader the passband of the channel output, but the more pronounced are the two small peaks 60,61 in the output power response of FIG. 5.

Further modifications and variations to the above described embodiments are possible without departing from the scope of the invention. For example, in some cases the use of the input waveguide 25 may not be necessary. Instead, the input (multiplexed) optical signal may be input directly to the first slab coupler 27.

Instead of one detector 24 for each channel output, a pair of detectors may be provided for each channel i.e. one detector for each single mode waveguide. The output from the pair of detectors for any one channel would then be combined, in the electronic circuitry 38, to give an overall power reading for that wavelength channel.

Instead of two single mode waveguides for each channel output, it would be possible to use three or more single mode waveguides for each channel output, although space constraints on the AWG die may make this less practical to implement than the use of twin waveguides.

Moreover, instead of being single mode waveguides, double mode waveguides, or multi-mode waveguides supporting more than two modes, could be used. This may further flatten the power output response for each wavelength channel output. While such output waveguides still have the advantage of providing a flatter peak in the output response and/or a broader passband, they are generally less preferred since a problem with double mode waveguides is that any bending of the waveguides can result in degradation/power loss in the light signal supported therein. In particular, large bends can cause problems. In order to keep AWG device size to a minimum it is normally desirable to bend the output waveguides.

Figure 6:
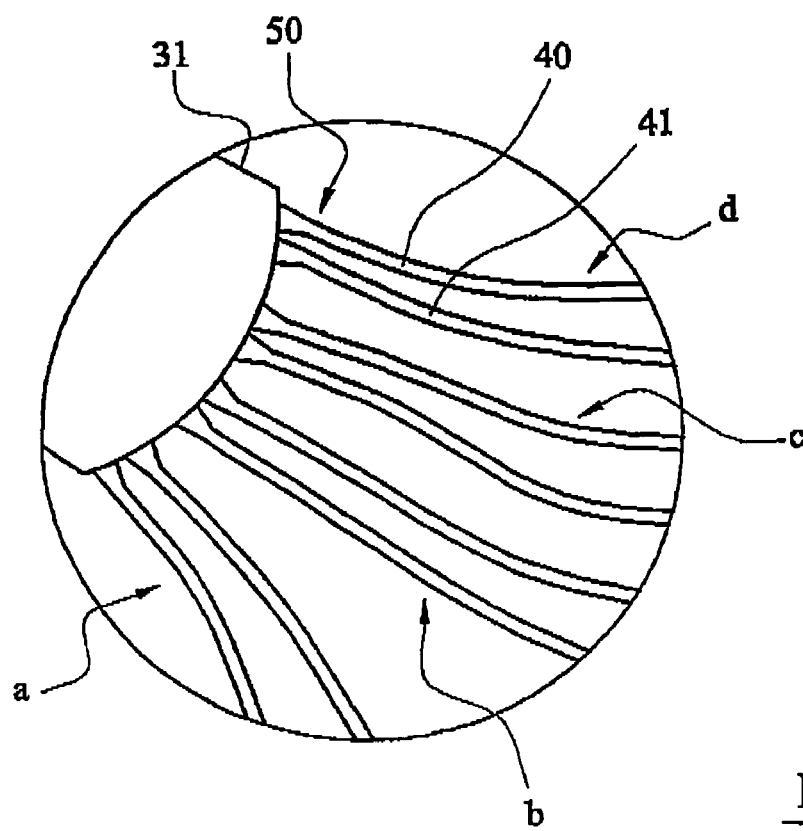
FIG. 6 shows a modified version of the device of FIG. 4.

In other possible embodiments the ends 50 of the waveguides 40,41 which are connected to the second slab coupler 31 could be tapered outwardly (in width) towards the slab coupler. Such tapering is known to provide broadening of the wavelength channel passband FIG. 6 illustrates such tapering of the output waveguide ends. In this embodiment the waveguide ends taper adiabatically outwards towards the second slab coupler. The same effect can alternatively be achieved by adiabatically tapering the output waveguide ends inwardly towards the slab coupler. The size and geometry of the tapers influences the shape of the super- (or system-) modes in each pair of single mode waveguides, and can thus be used to manipulate these modes in order to achieve a desired channel passband shape. This can be done using waveguide widths which either increase or decrease towards the slab coupler.

The ends of the array waveguides 29 may be tapered in a similar manner where they are coupled to the first and/or second slab couplers 27,31. Additionally, or alternatively, the output ends 60 of the output waveguides 33 may taper outwardly in width towards the output edge 35 of the die 22, if desired.

The invention claimed is:

1. An optical power monitor comprising:
an array waveguide grating comprising first and second optical interaction regions between which an input optical signal propagates from a first position on a first side of the first optical interaction region to a second position on a second optical interaction region, a correspondence between said first and second position depending upon a wavelength of the optical signal, there being a plurality of array waveguides coupled between a second side of the first optical interaction region and a first side of the second optical interaction region, and a plurality of output waveguides coupled at one end to the second side of the second optical interaction region for outputting different wavelength channel outputs from the second optical interaction region; and detector for detecting said different wavelength channel outputs at the other ends of the output waveguides; wherein
the plurality of output waveguides includes at least two adjacent output waveguides for outputting a respective one of the wavelength channel outputs to a single said detector means.

2. A power monitor according to claim 1, wherein the detector means comprises at least one detector for each channel output.

3. A power monitor according to claim 1, wherein two adjacent singe mode output waveguides are provided for each channel output.

4. A power monitor according to claim 3, wherein more than two adjacent single mode output waveguides are provided for each channel.

5. A power monitor according to claim 3, wherein said other ends of the two adjacent single mode output waveguides for each channel are spaced sufficiently close, together at the detector means to enable a single detector to be used to detect the output from each output waveguide for the said channel.

6. A power monitor according to claim 3, wherein the detector means comprises a plurality of detectors, there being one detector for each single mode output waveguide.

7. A power monitor according to claim 1, wherein said at least two adjacent output waveguides for the respective wavelength channel output are multiple mode waveguides.

8. A power monitor according to claim 7, wherein said at least two adjacent output waveguides for the respective wavelength channel output are double mode waveguides.

9. A power monitor according to claim 1, wherein said output waveguide ends which are coupled to the second side of the second optical interaction region taper towards said second optical interaction region.

10. A power monitor according to claim 9, wherein said output waveguide ends taper outwardly towards said second optical interaction region.

11. A power monitor according to claim 9, wherein said output waveguide ends taper adiabatically towards said second optical interaction region.

12. A dispersive optical device for use in a power monitor, the device comprising: an array waveguide grating comprising first and second optical interaction regions between which an input optical signal propagates from a first position on a first side of the first optical interaction region to a second position on a second side of the second optical interaction region, a correspondence between said first and second positions depending upon a wavelength of the optical signal, there being a plurality of array waveguides coupled between a second side of the first optical interaction region and a first side of the second optical interaction region, and a plurality of output waveguides coupled at one end to the second side of the second optical interaction region for outputting different wavelength channel outputs from the second optical interaction region to an output edge of the optical device; wherein the other end of each said output waveguide terminates at said output edge of the optical device, and the plurality of output waveguides includes at least two adjacent output waveguides for outputting a respective one of the channel outputs to a single said detector means.

13. A dispersive optical device according to claim 12, wherein two adjacent single mode output waveguides are provided for each wavelength channel output.

14. A communications system incorporating at least one power monitor according to claim 1.

15. A communications system incorporating at least one dispersive optical device according to claim 12.

* * * * *